Figure 1:
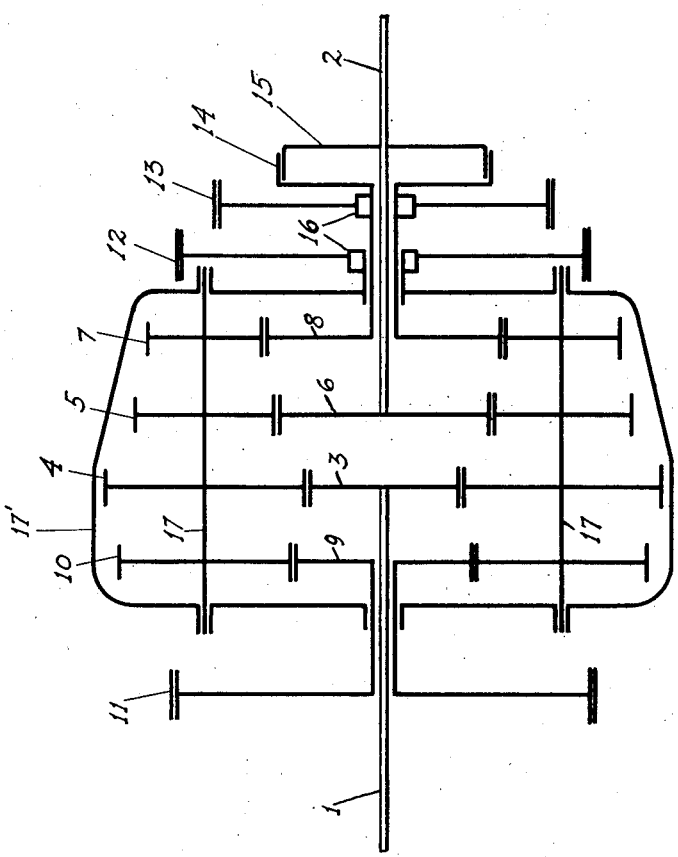

Oct. 18, 1932.  M. BJÖRNDAL ET AL  1,883,500
VARIABLE SPEED GEARING
Filed Nov. 24, 1930  3 Sheets-Sheet 1

Emil Ager Wick
Magnus Bjorndal
INVENTORS

BY Walter J. Gill
ATTORNEY

Oct. 18, 1932. M. BJÖRNDAL ET AL 1,883,500
VARIABLE SPEED GEARING
Filed Nov. 24, 1930  3 Sheets-Sheet 2

Emil Ager Wick
Magnus Bjorndal
INVENTORS

BY Walter J. Gill
ATTORNEY

Emil Ager Wick
Magnus Bjorndal
INVENTORS

Patented Oct. 18, 1932

1,883,500

UNITED STATES PATENT OFFICE

MAGNUS BJÖRNDAL, OF JERSEY CITY, NEW JERSEY, AND EMIL AGER WICK, OF BROOKLYN, NEW YORK

VARIABLE SPEED GEARING

Application filed November 24, 1930. Serial No. 497,812.

The present invention relates to variable speed, or speed changing, gearing for motor driven vehicles or any other contrivance where such gears may be applied. The gears are of the planetary type with provision for two, three or more forward speeds and one or more reverse speeds. The main feature of this invention is that it provides for automatic change of gears between two or more speeds in such a manner as to make the driving of a motor car safer, easier and more convenient than with present models. In the standard automobile there are three forward and one reverse speeds. Applied in such a vehicle we prefer to arrange the gears in such a way that the shifting between second and third (high) speed will be done automatically by a centrifugal regulator in accordance with the speed of the car. An arrangement is also made whereby this automatic shifting of gears will be done at a different speed going up a hill than on a level road, this being of great importance in practical driving.

In a car equipped with our invention the present-day type of gear shifting mechanism will be entirely eliminated and in its stead change of gears will be done by the same foot pedal whereby the clutch is operated. This is so arranged that when the clutch pedal is in its upward end-position the transmission is in second gear, by pushing the pedal slightly downward the gear is changed to first, as the pedal is pushed further downward the motor is disconnected from the transmission and by pushing the pedal to its extreme downward position gears are changed to reverse. Driving a motor car equipped with our invention will be considerably simplified, easier and more convenient and safer than with the present models.

A large proportion of the driving of a motor car is done in high speed or in second speed. With this invention no attention will be required as far as shifting between these gears is concerned. All the driver needs to do is to steer and step on the gas pedal. By giving the motor more gasoline it will speed up the car and automatically change to high at a certain speed. By a special arrangement this speed is not the same when going up a hill as on a horizontal road. If the driver then wishes to slow down again he gives the motor less gasoline, the motor slows down, and automatically the gear is changed back to second speed. If now further slowing down is desired the driver, without taking his hand off the steering wheel, gives the clutch pedal a slight downward movement with his foot and the gear is immediately, without any neutral point, changed to first speed. By pushing the clutch pedal a little further in, the motor will be disconnected, and by applying the brakes the car will come to a stand-still. If it is desired to reverse the gear the foot pedal is pushed in as far as it will go. When again starting forward the driver releases the pressure on the pedal which by a spring motion again passes back through the point where the motor is disconnected and smoothly, without jerks or excessive strains on the transmission, the car is started in motion in first gear. The driver next takes his foot off the clutch pedal which by the force of its spring is brought out in the extreme upward position and thus automatically and smoothly changes gear from first to second. By stepping on the gas pedal the car is accelerated and the centrifugal regulator will automatically change to third or high gear. Arranged in this way three forward speeds are ordinarily entirely sufficient, but more speeds may be had by an extension of the described arrangement.

Another important feature of our invention, marking a great improvement over existing gear change mechanisms, is the ability to change gears with all gears in mesh all the time and without any neutral points. This arrangement makes it impossible for an inexperienced driver to change directly from first to third gear without first going through second gear. The motor and transmission are thus saved excessive strains and wear by a smooth change from one speed to another. Neither it is possible that the motor can attain an excessive speed while running in neutral with following strains and jerks when the gears are changed as was the case with the earlier types of planetary gears. The feature that makes all this possible is the ratchet arrangement on which the brake pulleys for first and second gears are mounted.

Figure 2:
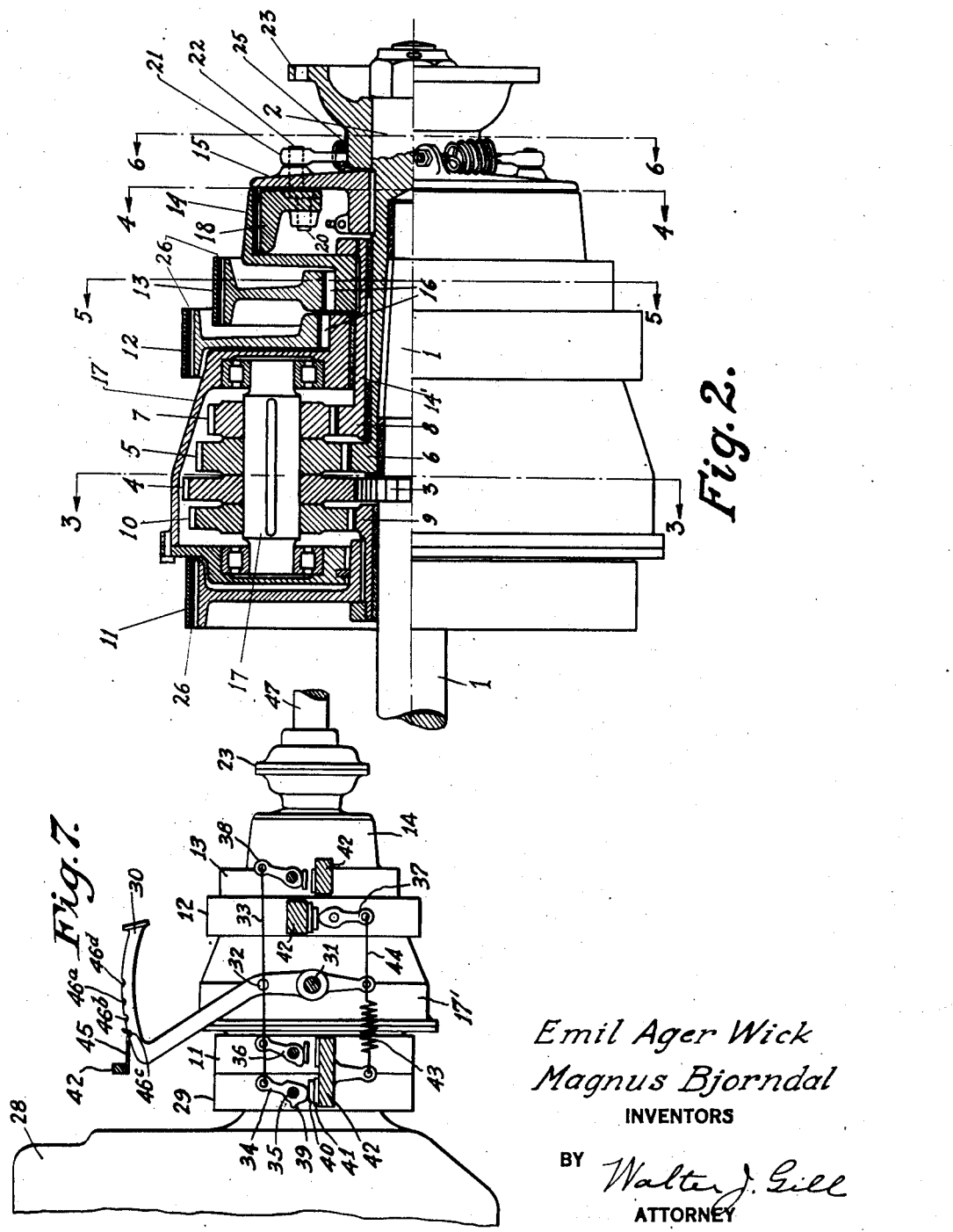
Figure 3:
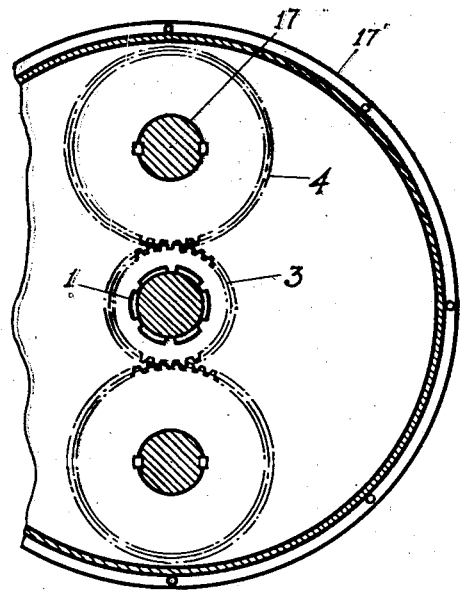
Figure 4:
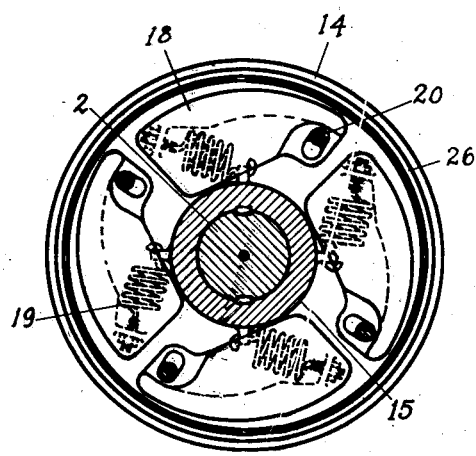
Figure 5:
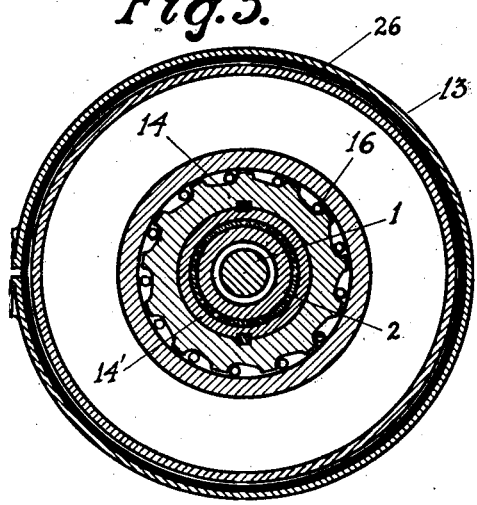
Figure 6:
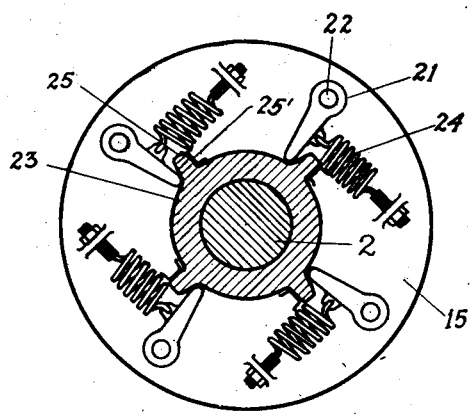

The accompanying drawings forming part of the application, show a preferred embodiment of our invention. It should be understood, however, that different designs may be carried out without deviating from the general principles of the invention. Figure 1 shows a schematic axial section of a planetary transmission gearing, embodying the invention and illustrating the action of the several gears. Figure 2 represents the same axial section, as Figure 1, in a practical design of a transmission gearing embodying our invention. Figure 3 is a transverse section taken along the line 3—3 in Figure 2. Figure 4 represents a transverse section along the line 4—4, Figure 5 is a transverse section along the line 5—5 and Figure 6 is a transverse section along the line 6—6, all in Fig. 2. Figure 7 shows diagrammatically how the various brakes are arranged and operated by the foot pedal.

Referring to Figure 2: The motor shaft 1 is connected through a multitude of gears to the transmission shaft 2. Gear 3 which is splined on 1 drives the gear 4 mounted rigidly on the shaft 17. On this shaft 17 are also the gears 5, 7 and 10 all rigidly connected thereto. Gear 6 forms a part of the transmission shaft 2 while gears 8 and 9 are mounted on sleeves rotatable on shafts 2 and 1 respectively. Numerals 11 and 13 indicate brakes so arranged that gears 9 and 8 may be stopped from rotating about their several axes. Shafts 17 are mounted in housing 17' rotatable on shafts 1 and 2 and equipped with the brake 12. 26 indicates the linings for these three brakes. A clutch 14 is operated by a centrifugal regulator 15 whereby shafts 1 and 2 may be rigidly connected as is desired when the car shall run in high gear. Together these several gears and brakes form a planetary gear shift providing three forward and one reverse speeds.

Referring to Figure 3: In this figure is shown a section through the shaft 1 with the splined on gear 3 which is in mesh with the gears 4, these are again mounted rigidly on shafts 17 which may rotate in bearings forming part of the housing 17'.

Referring to Figure 4: This is a section through the centrifugal regulator, or rather centrifugal clutch, which is made up of the following parts: One part of this centrifugal clutch 14 is keyed to a sleeve 14' forming an integral part with gear 8. The other part of the clutch consists of the hub 15 which is keyed to the transmission shaft 2. Weights 18 with counter springs 19 are mounted rotatably on eccentric taps 20 the other ends 22 of which are mounted in a bearing in hub 15 and each is equipped with a lever 21 (see Figs. 2 and 6). The weights 18 are normally held down against hub 15 by the springs 19. The tension of these springs may be regulated so that at a certain predetermined speed the weights 18 will fly out against the brake lining 26 and by reason of their special construction and by the centrifugal pressure will cause such friction that part 14 will be held rigidly to part 15.

Referring to Fig. 5: This view shows a section through shaft 1 where it extends into shaft 2 on which is mounted the sleeve 14' integral with gear 8. To this sleeve is keyed the part 14 which forms the inner part of a ratchetwheel with rollers 16, the outside part of this ratchetwheel consisting of the brake 13 with its lining 26. When brake 13 is applied the part 14 is free to rotate in an anti-clockwise direction but can not rotate in the opposite direction.

Referring to Fig. 6: This section shows the mechanism whereby it is made possible to automatically change gears at different speeds when going uphill than when on a level road. This section must be considered together with Figure 4. Shaft 2 carries the coupling 23 which is only loosely mounted thereon. The hub of coupling 23 has four toothlike projections 25 which on one side lay against the stops 25' integral with and projecting from hub 15. On the other side each of these teeth works against one of the levers 21 which operate the eccentric taps 22 and 20 and are held tightly against the teeth 25 by the springs 24. Each spring 24 is adjustable so that at a certain torque the motor will turn the hub 23 in an anti-clockwise direction thus turning the eccentrics 20 whereby the springs 19 are drawn up harder and it will thus require a higher speed before the weights 18 will fly out and change gear from second to high.

Referring to Fig. 7: This figure gives a diagrammatic illustration of how the various brakes controlling the change of gears may be operated by the clutch pedal. The brakes 11, 12 and 13 as well as parts 14, 17' and 23 are the same as shown in Fig. 2. The motor 28 is connected to the gear shift through the clutch 29. The clutch pedal 30 is mounted on the tap 31 and has a tap 32 connected through arms 33 to the cam-levers 34, 36 and 38 mounted on taps 35. These cams 39 are of such a shape that according to the position of the clutch pedal the various brake bands 40 will be drawn up tight against the other end of the same band 41 which is rigidly fastened to a beam 42. These beams 42 as well as taps 31 and 35 are supported from the body of the car and are therefore shown in cross-section. The clutch pedal 30 is held in its outward position by the springs 43, one end of which is connected to an arm extending from beam 42, another arm connects the foot pedal with the cam lever 37 which operates brake 12. This brake must function in the opposite direction of the other brakes. The foot pedal 30 is made with four notches, 46a, 46b, 46c, and 46d, in which a spring member 45 will act as a stop, i. e. an audible click will be heard and the driver will feel the point when the spring is in the notch and thus he knows he has changed gear. Fig. 7 also shows how shaft 2 is coupled through the coupling 23 to the continuation of the transmission shaft 47.

The operation of the gear shift in general is as follows: Starting with the motor in neutral in which condition the notch 46a is in engagement with member 45. In this case all the brakes are free and there is no transmission of power. First speed may be obtained by letting the foot pedal move out one notch, that is, until member 45 engages notch 46b. In doing so the clutch 29 (Fig. 7) has connected the motor to the transmission and at the same time brake 13 has been applied holding gear 8 rigidly against rotation in one direction on account of the ratchet. The motor shaft 1 will then drive the transmission shaft 2 through the gears 3, 4, 5 and 6 in the manner of a planetary gear. To obtain second speed foot pedal is allowed to move out to its end-position whereby brake 12 is applied. In this condition the member 45 is in engagement with notch 46c. Brake 12 holds the housing 17' from rotating in one direction due to the ratchet and thus the reduction in speed is like a common spur gear reduction between gears 3, 4, 5 and 6, there being no planetary action as in the case of first gear and reverse.

The driver may now take his foot off the clutch pedal and if more speed is desired he needs only step on the gas pedal, the motor thus speeding up and accelerating the car to a point where the centrifugal clutch automatically changes gear to "high" which is done by weights 18 flying out and making contact with 14 thus making the gear shift one solid whole so that the transmission shaft 2 is revolving at the same speed as the motor shaft 1. It must be remembered, however, that brakes 12 and 13 are still not released, but the ratchet mechanisms, as described above, will permit the motor and transmission to revolve in an anticlockwise direction when viewing the mechanism from the right hand end of Fig. 1. By giving the motor less gasoline it will slow down, the centrifugal clutch will automatically change back to second gear and from here the driver may change to first and neutral by pushing down the clutch pedal 30.

By pushing the pedal to its extreme downward position it will change speed to reverse by applying brake 11. In this condition the notch 46d will be in engagement with member 45. The speed reduction here will follow by planetary action through gears 3, 4, 5, 6, 9 and 10, and due to the fact that the diameter of gear 9 is smaller than the diameter of gear 6 the direction of revolution of the transmission shaft 2 will be opposite to that of shaft 1. The fact that the gear shift first must go through neutral before it is possible to reverse removes the necessity of a ratchet device for brake 11. Brakes 12 and 13, however, must necessarily have this device as otherwise it would not be possible to change gears smoothly and noiselessly from first to second and third without any neutral points between.

From the foregoing description, taken in connection with the accompanying drawings, the construction and operation of our invention will be readily understood without requiring a more detailed explanation. Various changes in the form, proportion and minor details of construction and arrangement may be made without departing from the general principle of sacrificing any of the advantages of the invention claimed.

We claim:

1. In variable speed gearing of the planetary type for motor-driven vehicles providing a plurality of different speeds between a driving element and a driven element, the combination of a centrifugal clutch comprising a member associated with one of the elements, a plurality of eccentric taps mounted in the member and each having a lever, a flyweight mounted on each of the taps, a member associated with the other of the elements and which the flyweights are adapted to engage by the effect of centrifugal force, adjustable counter-springs for the flyweights, and means for actuating the levers and the taps in accordance with the torque of the driving element.

2. In variable speed gearing of the planetary type for motor-driven vehicles providing a plurality of different speeds between a driving element and a driven element, the combination of a centrifugal clutch comprising a member associated with one of the elements, a plurality of eccentric taps mounted in the member and each having a lever, a flyweight mounted on each of the taps, a member associated with the other of the elements and which the flyweights are adapted to engage by the effect of centrifugal force, adjustable counter-springs for the flyweights, adjustable springs connected to the levers and means actuated in accordance with the torque of the driving element for actuating the levers to overcome the effect of the springs and turn the taps to change the tension of the counter springs.

3. In variable speed gearing of the planetary type for motor-driven vehicles providing a plurality of different speeds between a driving element and a driven element, the combination of a centrifugal clutch comprising a member associated with one of the elements, a plurality of eccentric taps mounted in the member and each having a lever, a flyweight mounted on each of the taps, a member associated with the other of the elements and which the flyweights are adapted to engage by the effect of centrifugal force, adjustable counter-springs for the flyweights, adjustable springs connected to the levers, means actuated in accordance with the torque of the driving element for actuating the levers in one direction to overcome the effect of the springs and turn the taps to change the tension of the counter springs and stops for preventing movement of the levers in the other direction.

4. A variable speed gearing of the planetary type comprising a combination of a centrifugal clutch with a known arrangement of gears for obtaining a multitude of forward and reverse speeds, said centrifugal clutch having flyweights mounted on eccentric taps turnable by the reaction of the driven element through levers and adjustable counter springs, the flyweights being held in their inoperative position by separate adjustable counter springs, the tension of same and thus the action of the clutch being varied in accordance with the power transmitted from the driving to the driven element.

5. A variable speed gearing of the planetary type comprising a combination of a centrifugal clutch with a known arrangement of gears for obtaining a multitude of forward and reverse speeds, said centrifugal clutch having flyweights mounted on eccentric taps turnable by the reaction of the driven element through adjustable flexible coupling, the flyweights being counterbalanced by adjustable springs forming a means of regulating the action of said clutch in accordance with the torque developed.

6. A variable speed gearing substantially as described in the attached specification comprising a known type of planetary gear operable without the common gear lever and having an automatic centrifugal clutch for change between high and the next lower speed, said clutch forming the link between the driving and driven element, flexible coupling means for permitting an angular displacement between the two elements, said displacement through adjustable means effecting a change in the position of the flyweights, actuating the clutch, inside of predetermined limits.

7. A variable speed gearing substantially as described in the attached specifications comprising a known type of planetary gearing operable without the common gear lever and having an automatic centrifugal clutch for change between two or more speeds, said clutch forming the link between the driving and driven elements, flexible coupling means for permitting an angular displacement between the two elements proportional to the acting force, said displacement through adjustable means effecting a change in the position and adjustment of the clutch actuating flyweights by varying the centripetal force thus rendering said clutch operable at different speeds inside predetermined limits.

In testimony whereof we affix our signatures.

EMIL AGER WICK.
MAGNUS BJÖRNDAL.